US012777408B2

(12) United States Patent
Li et al.

(10) Patent No.: US 12,777,408 B2
(45) Date of Patent: Oct. 27, 2026

(54) METHOD AND APPARATUS FOR DETERMINING AVAILABLE STATE OF SPECIFIED REFERENCE SIGNAL, AND COMMUNICATION DEVICE

(71) Applicant: Beijing Xiaomi Mobile Software Co., Ltd., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 570 days.

(21) Appl. No.: 18/249,522

(22) PCT Filed: Oct. 19, 2020

(86) PCT No.: PCT/CN2020/122010
§ 371 (c)(1),
(2) Date: Apr. 18, 2023

(87) PCT Pub. No.: WO2022/082400
PCT Pub. Date: Apr. 28, 2022

(65) Prior Publication Data
US 2023/0388911 A1 Nov. 30, 2023

(51) Int. Cl.
*H04W 48/16* (2009.01)
*H04W 56/00* (2009.01)

(52) U.S. Cl.
CPC ......... *H04W 48/16* (2013.01); *H04W 56/001* (2013.01)

(58) Field of Classification Search
CPC .... H04W 48/16; H04W 56/01; G06V 10/761; G06V 40/103; G06V 10/26; G06V 20/52; G06T 7/11; G06T 7/62; G06T 7/00; G06T 7/254
See application file for complete search history.

(56) References Cited

U.S. PATENT DOCUMENTS

2015/0288483 A1* 10/2015 Sun ....................... H04L 5/0048 370/329
2018/0254868 A1* 9/2018 Saito ..................... H04L 5/0048
2018/0324850 A1 11/2018 Amuru et al.

FOREIGN PATENT DOCUMENTS

CN 108668355 A 10/2018
CN 110166195 A 8/2019
CN 111585724 A 8/2020
EP 3585117 A1 12/2019

OTHER PUBLICATIONS

"CSI-RS for mobility purposes," Proceedings of the 3GPP TSG RAN WG1#89, Nokia, Alcatel-Lucent Shanghai Bell, R1-1708238, May 15, 2017, Hangzhou, P.R. China, 9 pages.

* cited by examiner

*Primary Examiner* — Diane D Mizrahi
(74) *Attorney, Agent, or Firm* — McCoy Russell LLP

(57) ABSTRACT

A method for determining an available state of a specified reference signal includes: obtaining an available state of one or more specified reference signals from remaining minimum system information RMSI, where the specified reference signal is configured to assist a terminal in time-frequency domain synchronization with a network.

8 Claims, 6 Drawing Sheets

METHOD AND APPARATUS FOR DETERMINING AVAILABLE STATE OF SPECIFIED REFERENCE SIGNAL, AND COMMUNICATION DEVICE

CROSS REFERENCE TO RELATED APPLICATION

The present application is a U.S. National Phase of International Application No. PCT/CN2020/122010 entitled "SPECIFIED REFERENCE SIGNAL AVAILABILITY STATUS DETERMINATION METHOD, APPARATUS, AND COMMUNICATION DEVICE," and filed on Oct. 19, 2020. The entire contents of the above-listed application are hereby incorporated by reference for all purposes.

BACKGROUND

In a wireless communication system, a terminal may use information in a tracking reference signal (TRS) or channel state information-reference signal (CSI-RS) to implement time-frequency domain synchronization with a network.

SUMMARY

The present disclosure relates to the technical field of wireless communications, and in particular, to a method and apparatus for determining an available state of a specified reference signal, and a communication device.

A method for determining an available state of a specified reference signal, provided in an example of a first aspect of the present disclosure, is applied to a terminal, and includes: obtaining an available state of one or more specified reference signals from remaining minimum system information RMSI, where the specified reference signal is configured to assist the terminal in time-frequency domain synchronization with a network.

A method for determining an available state of a specified reference signal, provided in an example of a second aspect of the present disclosure, is applied to a base station, and includes: updating an available state of one or more specified reference signals in RMSI in response to a change in the current available state of the one or more specified reference signals, where the specified reference signal is configured to assist the terminal in time-frequency domain synchronization with a network.

A communication device provided in yet another aspect of the present disclosure includes: a transceiver; a memory; and a processor, which is connected to the transceiver and the memory respectively, is configured to control wireless signal transceiving of the transceiver by executing computer executable instructions on the memory, and can implement the foregoing method for determining an available state of a specified reference signal.

A non-transitory computer storage medium provided in an example of another aspect of the present disclosure stores computer executable instructions; and after the computer executable instructions are executed by a processor, the foregoing method for determining an available state of a specified reference signal can be implemented.

Additional aspects and advantages of the present disclosure will be partially given in the following description, and will become apparent from the following description or be learned from the practice of the present disclosure.

BRIEF DESCRIPTION OF THE DRAWINGS

The above and/or additional aspects and advantages of the present disclosure will become apparent and understandable from the description of examples with reference to the accompanying drawings.

DETAILED DESCRIPTION

Figure 1:
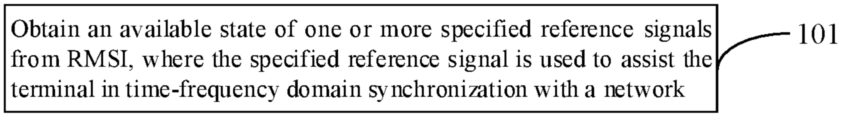
FIG. 1 is a schematic flowchart of a method for determining an available state of a specified reference signal according to an example of the present disclosure.

Examples will be described in detail, examples of which are illustrated in the accompanying drawings. The following description refers to the accompanying drawings in which the same numbers in different figures represent the same or similar elements unless otherwise indicated. Implementations set forth in the following description of examples do not represent all implementations consistent with the present disclosure. Instead, the implementations are merely examples of apparatuses and methods consistent with some aspects of the examples of the present disclosure as detailed in the appended claims.

The terms used in the examples of the present disclosure are merely for describing specific examples, rather than limiting the examples of the present disclosure. The terms "a/an" and "the" in singular forms used in the examples and the appended claims of the present application are also intended to include plural forms, unless otherwise clearly indicated in the context. It should be further understood that the term "and/or" used in the specification refers to and includes any or all possible combinations of one or more associated listed items.

It should be understood that although the terms "first", "second", "third", and the like may be used in the examples of the present disclosure to describe all types of information, the information is not limited to the terms. The terms are merely used to distinguish the same type of information from one another. For example, without departing from the scope of the examples of the present disclosure, the first information may also be referred to as second information, and similarly, the second information may also be referred to as first information. Depending on the context, the words if and "as if" as used in the specification may be interpreted as "when" or "while" or "in response to determining".

The examples of the present disclosure are described in detail below, and the examples of the examples are shown in the drawings, where the same or similar reference numerals throughout represent the same or similar elements. The examples described below with reference to the accompanying drawings are illustrative, are intended to explain the present disclosure, and cannot be understood as limitations to the present disclosure.

In related technologies, in order to ensure that all terminals may obtain a valid TRS or CSI-RS, connected terminals and disconnected terminals need to be informed, in a timely manner, of configuration information about the TRS or CSI-RS and state information about whether the TRS or CSI-RS is being broadcasted. However, frequent changes in the configuration information or broadcasted state of the TRS or CSI-RS easily cause the terminal to obtain system messages too frequently, which affects usage performance of the terminal.

A method and apparatus for determining an available state of a specified reference signal, and a communication device provided in the present disclosure are used to solve a problem in related technologies that usage performance of a terminal is affected by the fact that frequent changes in configuration information or a broadcasted state of a TRS or CSI-RS easily cause the terminal to obtain system messages too frequently during time-frequency domain synchronization with a network through information in the TRS or CSI-RS.

An example of the present disclosure provides a method for determining an available state of a specified reference signal, aiming at a problem in related technologies that usage performance of a terminal is affected by the fact that frequent changes in configuration information about or a broadcasted state of a TRS or CSI-RS easily cause the terminal to obtain system messages too frequently during time-frequency domain synchronization with a network through information in the TRS or CSI-RS.

According to the method and apparatus for determining an available state of a specified reference signal, the communication device, and the computer-readable storage medium provided in the examples of the present disclosure, an available state of each specified reference signal is obtained from RMSI, where the specified reference signal is configured to assist a terminal in time-frequency domain synchronization with the network. In addition, information configured to indicate whether a specified reference signal is available is set in the RMSI, so that the terminal may choose, according to the available state of the specified reference signal, a time for obtaining a system message through the specified reference signal, so as to reduce a frequency at which the terminal obtains the specified reference signal and ensure normal use of the terminal.

In the method for determining an available state of a specified reference signal according to the example of the present disclosure, an available state of one or more specified reference signals is obtained from RMSI. In addition, information configured to indicate whether a specified reference signal is available is set in the RMSI, so that the terminal may choose, according to the available state of the specified reference signal, a time for obtaining a system message through the specified reference signal, so as to reduce a frequency at which the terminal obtains the specified reference signal and ensure normal use of the terminal.

The following details a method and apparatus for determining an available state of a specified communication reference signal, a device, and a storage medium provided in the present application, with reference to the accompanying drawings.

FIG. 1 is a schematic flowchart of a method for determining an available state of a specified reference signal according to an example of the present disclosure, where the method is applied to a terminal.

As shown in FIG. 1, the method for determining an available state of a specified reference signal includes the following steps:

In step 101, an available state of one or more specified reference signals is obtained from RMSI, where the specified reference signal is configured to assist the terminal in time-frequency domain synchronization with a network.

It should be noted that the method for determining an available state of a specified reference signal in the example of the present disclosure may be applied to any terminal. The terminal may refer to a device for providing voice and/or data connectivity for a user. The terminal may be in communication with one or more core networks via a radio access network (RAN), and the terminal may be an Internet of Things terminal, such as a sensor device, a mobile phone (or "cellular" phone), and a computer having the Internet of Things terminal, for example, may be a fixed, portable, pocket, hand-held, computer built-in, or vehicle-mounted apparatus. For example, the terminal is a station (STA), a subscriber unit, a subscriber station, a mobile station, a mobile, a remote station, an access point, a remote terminal, an access terminal, a user terminal, a user agent, a user device, or user equipment (UE). Alternatively, the terminal may also be an unmanned aerial vehicle device. Alternatively, the terminal may also be a vehicle-mounted device, for example, may be a trip computer having a wireless communication function, or may be a wireless terminal connected to the trip computer externally. Alternatively, the terminal may also be a roadside device, for example, may be a street lamp, a signal light, or other roadside devices having a wireless communication function.

It should be noted that a base station sends system messages in a broadcast manner. A system message includes a master information block (MIB) and system information blocks (SIBs). The SIBs are further divided into SIB1 and other SIBs (such as SIB2, 3, 4 . . . ), and the RMSI in the example of the present disclosure is the SIB1. The MIB carries the necessary information required for the terminal to access a cell, including information such as a system frame number and a sub-carrier interval. The SIB1 carries scheduling information, access control information, and cell selection information about the other SIBs. The other SIBs carry parameters required for other functions, such as cell reselection, positioning, emergency notification, and sidelink. The terminal needs to constantly obtain MIBs and SIB1s. The terminal may select information in the other SIBs according to its own needs for reading.

The specified reference signal may include at least one of a TRS or a CSI-RS.

In the example of the present disclosure, the base station may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through TRS information, and it may be determined that the specified reference signal is a TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than that in broadcast state information. As long as one kind of the information changes, the base station broadcasts a system message to the terminal. That is, when the broadcast state information about the specified reference signal changes but the configuration information does not change, the terminal also reads the configuration information about the specified reference signal. As a result, the terminal reads the specified reference signal too frequently.

Because the system message broadcasted by the base station definitely includes RMSI, information that may be configured to indicate an available state of one or more specified reference signals may be carried in the RMSI. Consequently, the terminal may obtain the available state of each specified reference signal from the RMSI when obtaining the system message broadcasted by the base station, and determine, through the available state of the specified reference signal, whether the specified reference signal needs to be re-obtained currently, so as to obtain a system message related to the specified reference signal.

In the example of the present disclosure after the available state of each specified reference signal is determined, whether the specified reference signal needs to be obtained may be determined according to the available state of the specified reference signal and running requirements of the terminal.

As a possible implementation, the specified reference signal in an available state may be determined as a default time for obtaining the specified reference signal. That is, if the terminal determines that one or more specified reference signals are currently in the available state, the terminal may re-obtain the specified reference signals to obtain updated specified reference signals in a timely manner, which ensures accuracy of synchronization between the terminal and the network.

As another possible implementation, in order to meet diverse demands of users, the terminal may also obtain, according to actual running requirements of the terminal or user demands, specified reference signals when the specified reference signals are in an unavailable state. That is, if the terminal determines that a specified reference signal is currently in the unavailable state, and the terminal needs to obtain the specified reference signal according to an actual running requirement of the terminal, or needs to obtain the specified reference signal in response to some user requests, the terminal may also re-obtain the specified reference signal to meet the actual running requirement. It should be noted that when a specified reference signal is in the unavailable state and the terminal obtains the specified reference signal, the configuration information about the obtained specified reference signal may be unavailable.

In the method for determining an available state of a specified reference signal according to the example of the present disclosure, an available state of one or more specified reference signals is obtained from RMSI, where the specified reference signal is configured to assist a terminal in time-frequency domain synchronization with a network. In addition, information configured to indicate whether a specified reference signal is available is set in the RMSI, so that the terminal may choose, according to the available state of the specified reference signal, a time for obtaining a system message through the specified reference signal, so as to reduce a frequency at which the terminal obtains the specified reference signal and ensure normal use of the terminal.

In a possible implementation of the present disclosure, the available state of the specified reference signal may be represented by an existing send state field in the RMSI, and the configuration information about the specified reference signal may be stored in an SIB-X (X is not 1) to further improve convenience of obtaining the available state of the specified reference signal and the configuration information about the specified reference signal.

Another method for determining an available state of a specified reference signal, provided in an example of the present disclosure, will be further illustrated below with reference to FIG. 2.

Figure 2:
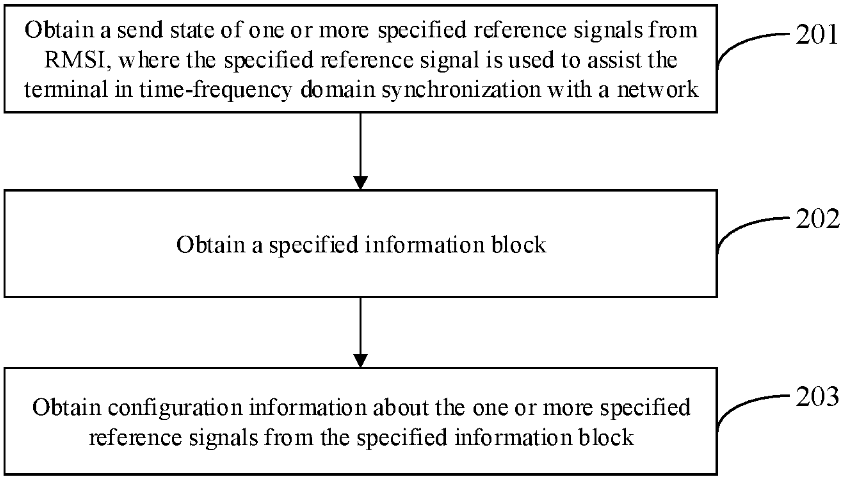
FIG. 2 is a schematic flowchart of another method for determining an available state of a specified reference signal according to an example of the present disclosure.

FIG. 2 is a schematic flowchart of another method for determining an available state of a specified reference signal according to an example of the present disclosure, where the method is applied to a terminal.

As shown in FIG. 2, the method for determining an available state of a specified reference signal includes the following steps:

In step 201, a send state of one or more specified reference signals is obtained from RMSI, where the specified reference signal is configured to assist the terminal in time-frequency domain synchronization with a network.

It should be noted that the method for determining an available state of a specified reference signal in the example of the present disclosure may be applied to any terminal. The terminal may refer to a device for providing voice and/or data connectivity for a user. The terminal may be in communication with one or more core networks via a radio access network (RAN), and the terminal may be an Internet of Things terminal, such as a sensor device, a mobile phone (or "cellular" phone), and a computer having the Internet of Things terminal, for example, may be a fixed, portable, pocket, hand-held, computer built-in, or vehicle-mounted apparatus. For example, the terminal is a station (STA), a subscriber unit, a subscriber station, a mobile station, a mobile, a remote station, an access point, a remote terminal, an access terminal, a user terminal, a user agent, a user device, or user equipment (UE). Alternatively, the terminal may also be an unmanned aerial vehicle device. Alternatively, the terminal may also be a vehicle-mounted device, for example, may be a trip computer having a wireless communication function, or may be a wireless terminal connected to the trip computer externally. Alternatively, the terminal may also be a roadside device, for example, may be a street lamp, a signal light, or other roadside devices having a wireless communication function.

It should be noted that a base station sends system messages in a broadcast manner. A system message includes a master information block (MIB) and system information blocks (SIBs). The SIBs are further divided into SIB1 and other SIBs (such as SIB2, 3, 4 . . . ), and the RMSI in the example of the present disclosure is the SIB1. The MIB carries the most necessary information required for the terminal to access a cell, including information such as a system frame number and a sub-carrier interval. The SIB1 carries scheduling information, access control information, and cell selection information about the other SIBs. The other SIBs carry parameters required for other functions, such as cell re-selection, positioning, emergency notification, and sidelink. The terminal needs to constantly obtain MIBs and SIB1s. The terminal may select information in the other SIBs according to its own needs for reading.

The specified reference signal may include at least one of a TRS or a CSI-RS.

In the example of the present disclosure, the base station may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through TRS information, and it may be determined that the specified reference signal is a TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than that in broadcast state information. As long as one kind of the information changes, the base station broadcasts a system message to the terminal. That is, when the broadcast state information about the specified reference signal changes but the configuration information does not change, the terminal also reads the configuration information about the specified reference signal. As a result, the terminal reads the specified reference signal too frequently.

Because the system message broadcasted by the base station definitely includes RMSI, information that may be configured to indicate an available state of each specified reference signal may be carried in the RMSI. Consequently, the terminal may obtain the available state of each specified reference signal from the RMSI when obtaining the system message broadcasted by the base station, and determine, through the available state of the specified reference signal, whether the specified reference signal needs to be re-obtained currently, so as to obtain a system message related to the specified reference signal.

As a possible implementation, the base station actually sends the specified reference signal when it is determined that the specified reference signal is in the available state, and does not send the specified reference signal when it is determined that the specified reference signal is in the unavailable state. Accordingly, the send state of the specified reference signal in the RMSI may be configured to represent the available state of the specified reference signal.

Specifically, after receiving the system message broadcasted by the base station, the terminal may obtain the send state of each specified reference signal from the RMSI to determine the available state of each specified reference signal according to the send state of each specified reference signal.

In the example of the present disclosure, if the one or more specified reference signals are currently in a send state, it may be determined that the specified reference signals are currently in an available state; or if the one or more specified reference signals are currently not in a send state, it may be determined that the specified reference signals are currently in an unavailable state.

In step 202, a specified information block is obtained.

In the example of the present disclosure, after the available state of each specified reference signal is determined, whether the specified reference signal needs to be obtained may be determined according to the available state of the specified reference signal and running requirements of the terminal.

As a possible implementation, the specified reference signal in an available state may be determined as a default time for obtaining the specified reference signal. That is, if the terminal determines that one or more specified reference signals are currently in the available state, the terminal may re-obtain the specified reference signals to obtain updated specified reference signals in a timely manner, which ensures accuracy of synchronization between the terminal and the network.

As another possible implementation, in order to meet diverse demands of users, the terminal may also obtain, according to actual running requirements of the terminal or user demands, specified reference signals when the specified reference signals are in an unavailable state. That is, if the terminal determines that a specified reference signal is currently in the unavailable state, and the terminal needs to obtain the specified reference signal according to an actual running requirement of the terminal, or needs to obtain the specified reference signal in response to some user requests, the terminal may also re-obtain the specified reference signal to meet the actual running requirement. It should be noted that when a specified reference signal is in the unavailable state and the terminal obtains the specified reference signal, the configuration information about the obtained specified reference signal may be unavailable.

The specified information block may be an SIB-X, where X is not 1. For example, the specified information block may be SIB2, SIB3, SIB4, or the like. In actual use, any SIB except the SIB1, including newly added SIB s, may be determined as the specified information block according to actual requirements and specific application scenarios. This is not limited in the example of the present disclosure.

As a possible implementation, configuration information about each specified reference signal may be stored in the specified information block SIB-X, so that the terminal may request the configuration information about the specified reference signal according to the demand of the terminal. Accordingly, when determining that the one or more specified reference signals are currently in an available state, the terminal may obtain the specified information block to obtain the configuration information about the specified reference signals from the specified information block. Alternatively, when the specified reference signals are in an unavailable state, but the terminal needs to obtain the specified reference signals according to the running requirements of the terminal, the terminal may also obtain the specified information block to obtain the configuration information about the specified reference signals from the specified information block.

Alternatively, the terminal may obtain the specified information block in a broadcast or on demand manner. That is, in a possible implementation of the example of the present disclosure, step 202 above may include:

reading the specified information block from a broadcast message window of a base station;

or requesting a base station for the specified information block in response to detecting that a broadcast state identification bit corresponding to the specified information block in the RMSI is a second set value.

As a possible implementation, if the terminal is configured to obtain the specified information block in a broadcast manner, the terminal may search and read the specified information block from the broadcast message window of the base station.

As another possible implementation, if the terminal is configured to obtain the specified information block in an on demand manner, that is, the broadcast state identification bit corresponding to the specified information block is the second set value, the terminal may actively send an obtaining request to the base station, so that the base station may broadcast the specified information block to the terminal after obtaining the obtaining request, and then the terminal may read the specified information block in the broadcast message window.

In step 203, configuration information about the one or more specified reference signals is obtained from the specified information block.

In the example of the present disclosure, after obtaining the specified information block, the terminal may obtain the configuration information about the specified reference signals from the specified information block.

In the method for determining an available state of a specified reference signal according to the example of the present disclosure, a send state of one or more specified reference signals is obtained from RMSI to indicate an available state of the specified reference signals according to the send state of the specified reference signals. The send state of the specified reference signal in the RMSI is configured to indicate the available state of the specified reference signal, so that the terminal may choose, according to the available state of the specified reference signal, a time for obtaining a system message through the specified reference signal, so as to reduce a frequency at which the terminal obtains the specified reference signal, ensure normal use of the terminal, and further improve the convenience of obtaining the available state of the specified reference signal and the configuration information about the specified reference signal.

In a possible implementation of the present disclosure, an identification bit dedicated to indicating an available state of a specified reference signal may be set in the RMSI to further improve flexibility of marking an available state of a reference signal.

Still another method for determining an available state of a specified reference signal, provided in an example of the present disclosure, will be further illustrated below with reference to FIG. 3.

Figure 3:
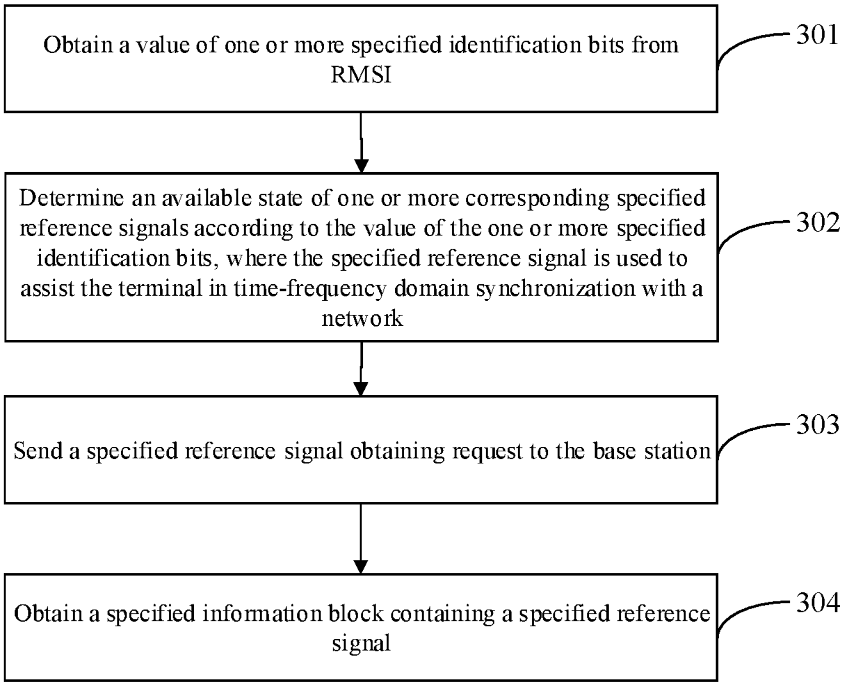
FIG. 3 is a schematic flowchart of still another method for determining an available state of a specified reference signal according to an example of the present disclosure.

FIG. 3 is a schematic flowchart of still another method for determining an available state of a specified reference signal according to an example of the present disclosure, where the method is applied to a terminal.

As shown in FIG. 3, the method for determining an available state of a specified reference signal includes the following steps:

In step 301, a value of one or more specified identification bits is obtained from RMSI.

It should be noted that the method for determining an available state of a specified reference signal in the example of the present disclosure may be applied to any terminal. The terminal may refer to a device for providing voice and/or data connectivity for a user. The terminal may be in communication with one or more core networks via a radio access network (RAN), and the terminal may be an Internet of Things terminal, such as a sensor device, a mobile phone (or "cellular" phone), and a computer having the Internet of Things terminal, for example, may be a fixed, portable, pocket, hand-held, computer built-in, or vehicle-mounted apparatus. For example, the terminal is a station (STA), a subscriber unit, a subscriber station, a mobile station, a mobile, a remote station, an access point, a remote terminal, an access terminal, a user terminal, a user agent, a user device, or user equipment (UE). Alternatively, the terminal may also be an unmanned aerial vehicle device. Alternatively, the terminal may also be a vehicle-mounted device, for example, may be a trip computer having a wireless communication function, or may be a wireless terminal connected to the trip computer externally. Alternatively, the terminal may also be a roadside device, for example, may be a street lamp, a signal light, or other roadside devices having a wireless communication function.

It should be noted that a base station sends system messages in a broadcast manner. A system message includes a master information block (MIB) and system information blocks (SIBs). The SIBs are further divided into SIB1 and other SIBs (such as SIB2, 3, 4 . . . ), and the RMSI in the example of the present disclosure is the SIB1. The MIB carries the most necessary information required for the terminal to access a cell, including information such as a system frame number and a sub-carrier interval. The SIB1 carries scheduling information, access control information, and cell selection information about the other SIBs. The other SIBs carry parameters required for other functions, such as cell re-selection, positioning, emergency notification, and sidelink. The terminal needs to constantly obtain MIBs and SIB1s. The terminal may select information in the other SIBs according to its own needs for reading.

In the example of the present disclosure, the base station may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through TRS information, and it may be determined that the specified reference signal is a TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than that in broadcast state information. As long as one kind of the information changes, the base station broadcasts a system message to the terminal. That is, when the broadcast state information about the specified reference signal changes but the configuration information does not change, the terminal also reads the configuration information about the specified reference signal. As a result, the terminal reads the specified reference signal too frequently.

Because the system message broadcasted by the base station definitely includes RMSI, information that may be configured to indicate an available state of each specified reference signal may be carried in the RMSI. Consequently, the terminal may obtain the available state of each specified reference signal from RMSI when obtaining the system message broadcasted by the base station, and determine, through the available state of the specified reference signal, whether the specified reference signal needs to be re-obtained currently, so as to obtain a system message related to the specified reference signal.

The specified reference signal may include at least one of a TRS or a CSI-RS.

As a possible implementation, a specified identification bit dedicated to indicating the available state of each specified reference signal may be set in the RMSI, so that the base station may determine, according to the current available state of each specified reference signal, the value of the specified identification bit corresponding to each specified reference signal to indicate the available state of the specified reference signal through the value of the specified identification bit.

Specifically, the value of the specified identification bit corresponding to each specified reference signal may be determined through the following principle. When the specified reference signal is currently in an available state, the value of the specified identification bit corresponding to the specified reference signal may be determined as a first set value; when the specified reference signal is currently in an unavailable state, the value of the specified identification bit corresponding to the specified reference signal may be determined as a second set value.

It may be understood that the specified reference signal in an available state indicates that configuration information about the specified reference signal is valid and the specified reference signal is in a send state, that is, the terminal may obtain valid configuration information about the specified reference signal. The specified reference signal in an unavailable state indicates that the specified reference signal has configuration information but is in a non-send state; or configuration information about the specified reference signal is in a broadcast state, but the configuration information in the broadcast state is invalid; or the specified reference signal has no configuration information and is not in a send state, which is not limited in this example.

It should be noted that in actual use, the first set value and the second set value may be determined according to actual requirements and specific application scenarios, which is not limited in the example of the present disclosure. For example, the first set value is 1, and the second set value is 0; or the first set value is 0 and the second set value is 1; or the first set value is true and the second set value is false; or the first set value is false and the second set value is true.

In the example of the present disclosure, after obtaining a system message broadcasted by the base station, the terminal may obtain a value of a specified identification bit corresponding to each specified reference signal from RMSI to determine, according to the value of each specified identification bit, whether each specified reference signal is currently in an available state.

In step 302, an available state of one or more corresponding specified reference signals is determined according to the value of the one or more specified identification bits, where the specified reference signal is configured to assist the terminal in time-frequency domain synchronization with a network.

In the example of the present disclosure, a corresponding relationship between a value of a specified identification bit and an available state may be preset, so that after the value of each specified identification bit is obtained, the available state of each specified reference signal may be determined according to the value of each specified identification bit and the corresponding relationship between the value of the specified identification bit and the available state.

Specifically, a specified identification bit may have two values: when the value of the specified identification bit corresponding to the specified reference signal is the first set value, it may be determined that the specified reference signal is currently in an available state; and when the value of the specified identification bit corresponding to the specified reference signal is the second set value, it may be determined that the specified reference signal is currently in an unavailable state.

In step 303, a specified reference signal obtaining request is sent to the base station.

In step 304, a specified information block containing a specified reference signal is obtained.

In the example of the present disclosure, after the available state of each specified reference signal is determined, whether the specified reference signal needs to be obtained may be determined according to the available state of the specified reference signal and running requirements of the terminal.

As a possible implementation, the specified reference signal in an available state may be determined as a default time for obtaining the specified reference signal. That is, if the terminal determines that the value of the specified identification bit corresponding to the one or more specified reference signals is the first set value, the terminal may determine that the specified reference signal is currently in an available state, and the terminal may re-obtain the specified reference signal and obtain an updated specified reference signal in a timely manner, which ensures accuracy of synchronization between the terminal and the network.

Specifically, the base station may broadcast system messages to the terminal periodically. When determining that configuration information about a specified reference signal changes, the base station may broadcast a configuration information change notification to the terminal and send changed configuration information, where a system message containing the changed configuration information indicates that the specified reference signal is in an available state. In this case, the terminal may directly obtain the configuration information about the specified reference signal from the system message broadcasted by the base station. However, if the system message currently obtained by the terminal is not the system message first broadcasted after the base station determines that the configuration information about the specified reference signal changes, the base station may not have sent the configuration information about the specified reference signal, that is, the system message may not contain the configuration information about the specified reference signals, so that the terminal may send the specified reference signal obtaining request to the base station after the terminal determines that the specified reference signal is currently in an available state and after the terminal has not obtained the configuration information about the specified reference signal from the system message, the base station sends the configuration information about the specified reference signal, and the terminal may obtain the specified information block including the specified reference signal from the system message broadcasted again by the base station to obtain the configuration information about the specified reference signal from the specified information block.

As another possible implementation, in order to meet diverse demands of users, the terminal may also obtain, according to actual running requirements of the terminal or user demands, specified reference signals when the specified reference signals are in an unavailable state. That is, if the terminal determines that a specified reference signal is currently in an unavailable state, and the terminal needs to obtain the specified reference signal according to an actual running requirement of the terminal, or needs to obtain the specified reference signal in response to some user requests, the terminal may also re-obtain the specified reference signal, but the obtained specified reference signal is unavailable, that is, the terminal cannot be in time-frequency domain synchronization with the network based on the obtained specified reference signal.

Specifically, after the terminal determines that the specified reference signal is currently in an unavailable state and after the terminal has not obtained the configuration information about the specified reference signal from the system message, the terminal may send the specified reference signal obtaining request to the base station, so that the base station sends the configuration information about the specified reference signal, and the terminal may obtain the specified information block including the specified reference signal from the system message broadcasted again by the base station to obtain the configuration information about the specified reference signal from the specified information block.

The specified information block may be an SIB-X, where X is not 1. For example, the specified information block may be SIB2, SIB3, SIB4, or the like. In actual use, any SIB except the SIB1, including newly added SIB s, may be determined as the specified information block according to actual requirements and specific application scenarios. This is not limited in the example of the present disclosure.

As a possible implementation, configuration information about each specified reference signal may be stored in the specified information block SIB-X, so that the terminal may request the configuration information about the specified reference signal according to the demand of the terminal. Accordingly, when determining that the one or more specified reference signals are currently in an available state, the terminal may obtain the specified information block to obtain the configuration information about the specified reference signals from the specified information block. Alternatively, when the specified reference signals are in an unavailable state, but the terminal needs to obtain the specified reference signals according to the running requirements of the terminal, the terminal may also obtain the specified information block to obtain the configuration information about the specified reference signals from the specified information block.

Alternatively, if the terminal is configured to obtain the specified information block in a broadcast manner, the terminal may search and read the specified information block from the broadcast message window of the base station.

Alternatively, if the terminal is configured to obtain the specified information block in an on demand manner, that is, the broadcast state identification bit corresponding to the specified information block is the second set value, the terminal may actively send an obtaining request to the base station, so that the base station may broadcast the specified information block to the terminal after obtaining the obtaining request, and then the terminal may read the specified information block in the broadcast message window.

In the example of the present disclosure, after obtaining the specified information block, the terminal may obtain the configuration information about the specified reference signals from the specified information block.

It should be noted that when the specified reference signal is in an unavailable state and the terminal sends the specified reference signal obtaining request to the base station, the base station may modify the value of the specified identification bit corresponding to the specified reference signal to the first set value according to a strategy of the terminal after obtaining the specified reference signal obtaining request from the terminal, or the base station may not modify the value of the specified identification bit corresponding to the specified reference signal, and broadcasts a system message to the terminal. If the base station modifies the value of the specified identification bit corresponding to the specified reference signal to the first set value, the terminal may obtain the specified information block from the RMSI of the system message, obtain the configuration information about the specified reference signal from the specified information block, and consider that the specified reference signal is being sent; or if the base station does not modify the value of the specified identification bit corresponding to the specified reference signal to the first set value, the terminal may still read the RMSI to obtain the specified information block and obtain the configuration information about the specified reference signal from the specified information block, but the specified reference signal is not in a send state.

Further, when configuration information in the base station changes, the base station broadcasts a system change notification to the terminal, so that the terminal obtains a change in system information from the base station in a timely manner. When obtaining the system message, the terminal may also determine, according to specific data that have changed in the system message, whether to obtain configuration information about the specified reference signal. Specifically, the following two cases may be included:

Case 1

In response to detecting a change in a value tag corresponding to a specified information block in the RMSI, the specified information block is obtained, and configuration information after any specified reference signal changes is obtained from the specified information block.

In the example of the present disclosure, when obtaining a system message containing a change notification, the terminal may detect whether the value tag corresponding to the specified information block in the RMSI changes to determine whether the configuration information about the specified reference signal has changed. In response to determining the change in the value tag corresponding to the specified information block in the RMSI, the terminal determines that the configuration information about the specified reference signal has changed, and determines to obtain the specified information block, so as to obtain updated configuration information about the specified reference signal from the specified information block. Specifically, whether the value tag corresponding to the specified information block in the RMSI changes may be detected in the following two situations:

1. If the current value of each specified identification bit is unchanged and a change notification, sent by the base station, of configuration information about one or more specified reference signal is obtained, a specified information block is obtained in response to detecting a change in a value tag corresponding to the specified information block in the RMSI; and configuration information after any specified reference signal changes is obtained from the specified information block.

In the example of the present disclosure, if the current value of each specified identification bit in the RMSI obtained by the terminal has not changed, a change notification, sent by the base station, of configuration information about any specified reference signal is obtained, and it is detected that the value tag (value tag) corresponding to the specified information block in the RMSI has changed, it may be determined that the configuration information about any specified reference signal has changed, then the specified information block may be obtained according to the value tag corresponding to the specified information block in the RMSI, and changed configuration information about the specified reference signal may be obtained from the specified information block.

2. If the current value of one or more specified identification bits has changed and a change notification, sent by the base station, of configuration information about one or more specified reference signals is obtained, updated RMSI and an updated specified information block are obtained in response to detecting a change in a value tag corresponding to the specified information block in the RMSI; and configuration information after the one or more specified reference signals change is obtained from the updated specified information block.

In the example of the present disclosure, if both the value of the specified identification bit corresponding to the specified reference signal and the configuration information change, that is, if it is determined that the current value of one or more specified identification bits changes, a change notification, sent by the base station, of configuration information about one or more specified reference signals is obtained, and the value tag corresponding to the specified information block in the RMSI changes, updated RMSI may be obtained to obtain an updated specified information block according to the value tag corresponding to the specified information block in the RMSI, and configuration information after the one or more specified reference signals change is obtained from the updated specified information block.

Case 2

Updated RMSI is obtained in the case where the current value of any specified identification bit changes.

In the example of the present disclosure, a change in a value of a specified identification bit corresponding to a specified reference signal may change RMSI; and a change in configuration information about the specified reference signal may change a value tag corresponding to a specified information block. Accordingly, when determining that the current value of any specified identification bit in the RMSI changes, the terminal may obtain the updated RMSI to detect whether the value tag corresponding to the specified information block in the RMSI changes. If a change in the value tag corresponding to the specified information block in the RMSI is detected, it may be determined that the configuration information about the specified reference signal changes, then the specified information block may be obtained according to the value tag corresponding to the specified information block in the RMSI, and configuration information after any specified reference signal changes may be obtained from the specified information block. If no change in the value tag corresponding to the specified information block in the RMSI is detected, it may be determined that the configuration information about each specified reference signal does not change, and obtaining of the specified information block does not need to continue.

In the example of the present disclosure, each specified reference signal may be a semi-continuous reference signal or a periodic reference signal, that is, the configuration information about the specified reference signal may change periodically or irregularly.

In the method for determining an available state of a specified reference signal according to the example of the present disclosure, a value of one or more specified identification bits is obtained from RMSI, and an available state of one or more corresponding specified reference signals is determined according to the value of the one or more specified identification bits. An identification bit dedicated to indicating an available state of a specified reference signal is set in the RMSI, so that the terminal may choose, according to the available state of the specified reference signal, a time for obtaining a system message through the specified reference signal, which reduces a frequency at which the terminal obtains the specified reference signal, ensures normal use of the terminal, and further improves flexibility of marking an available state of a reference signal.

In a possible implementation of the present disclosure, an available state of a specified reference signal may alternatively be indicated through scheduling information about SIB-X, so as to further improve convenience of obtaining the available state of the specified reference signal and the configuration information about the specified reference signal.

Yet another method for determining an available state of a specified reference signal, provided in an example of the present disclosure, will be further illustrated below with reference to FIG. 4.

Figure 4:
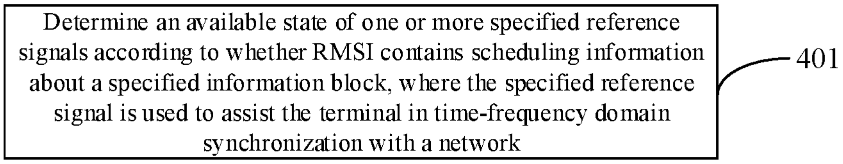
FIG. 4 is a schematic flowchart of yet another method for determining an available state of a specified reference signal according to an example of the disclosure.

FIG. 4 is a schematic flowchart of yet another method for determining an available state of a specified reference signal according to an example of the present disclosure, where the method is applied to a terminal.

As shown in FIG. 4, the method for determining an available state of a specified reference signal includes the following steps:

In step 401, an available state of one or more specified reference signals is determined according to whether RMSI contains scheduling information about a specified information block, where the specified reference signal is configured to assist the terminal in time-frequency domain synchronization with a network.

It should be noted that the method for determining an available state of a specified reference signal in the example of the present disclosure may be applied to any terminal. The terminal may refer to a device for providing voice and/or data connectivity for a user. The terminal may be in communication with one or more core networks via a radio access network (RAN), and the terminal may be an Internet of Things terminal, such as a sensor device, a mobile phone (or "cellular" phone), and a computer having the Internet of Things terminal, for example, may be a fixed, portable, pocket, hand-held, computer built-in, or vehicle-mounted apparatus. For example, the terminal is a station (STA), a subscriber unit, a subscriber station, a mobile station, a mobile, a remote station, an access point, a remote terminal, an access terminal, a user terminal, a user agent, a user device, or user equipment (UE). Alternatively, the terminal may also be an unmanned aerial vehicle device. Alternatively, the terminal may also be a vehicle-mounted device, for example, may be a trip computer having a wireless communication function, or may be a wireless terminal connected to the trip computer externally. Alternatively, the terminal may also be a roadside device, for example, may be a street lamp, a signal light, or other roadside devices having a wireless communication function.

It should be noted that a base station sends system messages in a broadcast manner. A system message includes a master information block (MIB) and system information blocks (SIBs). The SIBs are further divided into SIB1 and other SIBs (such as SIB2, 3, 4 . . . ), and the RMSI in the example of the present application is the SIB1. The MIB carries the necessary information required for the terminal to access a cell, including information such as a system frame number and a sub-carrier interval. The SIB1 carries scheduling information, access control information, and cell selection information about the other SIBs. The other SIBs carry parameters required for other functions, such as cell re-selection, positioning, emergency notification, and sidelink. The terminal needs to constantly obtain MIBs and SIB1s. The terminal may select information in the other SIBs according to its own needs for reading.

In the example of the present disclosure, the terminal may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through information in a TRS, and it may be determined that the specified reference signal is the TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than that in broadcast state information. As long as one kind of the information changes, the base station broadcasts a system message to the terminal. That is, when the broadcast state information about the specified reference signal changes but the configuration information does not change, the terminal also reads the configuration information about the specified reference signal. As a result, the terminal reads the specified reference signal too frequently.

Because the system message broadcasted by the base station definitely includes RMSI, information that may be configured to indicate an available state of each specified reference signal may be carried in the RMSI. Consequently, the terminal may obtain the available state of each specified reference signal from the RMSI when obtaining the system message broadcasted by the base station, and determine, through the available state of the specified reference signal, whether the specified reference signal needs to be re-obtained currently, so as to obtain a system message related to the specified reference signal.

The specified reference signal may include at least one of a TRS or a CSI-RS.

As a possible implementation, when the specified reference signal is in an available state, the base station may send configuration information about the specified reference signal, that is, the base station may broadcast the specified information block that stores the configuration information, and when the specified reference signal is in an available state, the RMSI may include the scheduling information about the specified information block; otherwise, the RMSI may not include the scheduling information about the specified information block. Accordingly, the available state of the specified reference signal may be implicitly represented through the scheduling information about the specified information block in the RMSI.

In the example of the present disclosure, when the terminal obtains a system message broadcasted by the base station, if it is determined that the RMSI includes the scheduling information about the specified information block, it may be determined that the specified information block contains the available specified reference signal.

It should be noted that the specified reference signal may be one or more. In a case of one specified reference signal, the RMSI includes the scheduling information about the specified information block, indicating that the specified reference signal is currently in an available state. In a case of more specified reference signals, the RMSI includes the scheduling information about the specified information block, indicating that at least one of the specified reference signals is currently in an available state, and the terminal may read the configuration information about the available specified reference signal from the specified information block.

In the example of the present disclosure, after the available state of each specified reference signal is determined, whether the specified reference signal needs to be obtained may be determined according to the available state of the specified reference signal and running requirements of the terminal.

As a possible implementation, the specified reference signal in an available state may be determined as a default time for obtaining the specified reference signal. That is, if the terminal determines that one or more specified reference signals are currently in an available state, the terminal may re-obtain the specified reference signals from the specified information block to obtain updated specified reference signals a timely manner, which ensures accuracy of synchronization between the terminal and the network.

It should be noted that when the available state of the specified reference signal is implicitly represented through the scheduling information about the specified information block in the RMSI, if there is currently no available specified reference signal, there is no scheduling information about the specified information block in RMSI.

Further, the available state of the specified reference signal may change. When determining that the specified reference signal currently changes to be unavailable, the terminal may set the specified information block stored in the terminal invalid or valid according to a strategy of the terminal. That is, in a possible implementation of the example of the present disclosure, the foregoing method may further include:

- updating the RMSI in response to determining that the scheduling information about the specified information block, which is sent by the base station, is from present to none; and
- setting the locally stored specified information block to an invalid state, or maintaining the locally stored specified information block in a valid state, in the case where the updated RMSI does not contain the scheduling information about the specified information block.

In the example of the present disclosure, currently no available specified reference signal may be determined in response to determining that the scheduling information about the specified information block, which is sent by the base station, is from present to none. In this case, the base station may delete the scheduling information about the specified information block in the RMSI to update the RMSI. In response to determining that the updated RMSI does not contain the scheduling information about the specified information block, the terminal may set the locally stored specified information block to an invalid state or maintain the locally stored specified information block in a valid state according to a strategy of the terminal.

Further, when the specified reference signal changes from an unavailable state to an available state, and the terminal has set the stored specified information block to an invalid state before, the terminal may forcibly obtain latest configuration information about the specified reference signal. That is, in a possible implementation of the example of the present disclosure, the foregoing method may further include:

updating the RMSI in response to determining that the scheduling information about the specified information block, which is sent by the base station, is from none to present; and obtaining the specified information block according to the scheduling information about the specified information block in updated RMSI.

In the example of the present disclosure, if it is determined that the scheduling information about the specified information block, which is sent by the base station, is from none to present, it may be determined that the specified reference signal is currently in an available state. When the specified information block stored in the terminal is currently in an invalid state, the terminal may obtain updated RMSI from a system message broadcasted by the base station, and obtain the scheduling information about the specified information block corresponding to the specified reference signal from the updated RMSI, to obtain the specified information block according to the scheduling information about the specified information block, so as to obtain latest configuration information about the specified reference signal.

Further, when the specified reference signal changes from an unavailable state to an available state, and the specified information block stored in the terminal is set to a valid state, the terminal may obtain the latest configuration information about the specified reference signal when determining that the configuration information about the specified reference signal changes. That is, in a possible implementation of the example of the present application, the foregoing method may further include:

The RMSI is updated in response to obtaining that the scheduling information about the specified information block, which is sent by the base station, is from none to some; and In response to detecting a change in the value tag of the specified information block in the updated RMSI, the specified information block is obtained according to the scheduling information about the specified information block in the updated RMSI.

In the example of the present disclosure, if it is obtained that the scheduling information about the specified information block, which is sent by the base station, is from none to some, it may be determined that the specified reference signal is currently in an available state. At this time, the value tag of the specified information block in the RMSI has changed, indicating that the configuration information about the specified reference signal has changed. In this case, an updated specified information block may be obtained according to the value tag in the updated RMSI. When the specified reference signal stored in the terminal is currently in a valid state, in order to reduce a frequency at which the terminal obtains the specified reference signal, the terminal may obtain the latest configuration information when determining that the configuration information about the specified reference signal has changed.

Specifically, after obtaining the updated RMSI from the system message broadcasted by the base station, the terminal may obtain a value tag of the specified information block from the updated RMSI, and when the value tag of the specified information block changes, it may be determined that the configuration information about the specified reference signal has changed. Consequently, scheduling information about the specified information block corresponding to the specified reference signal may be obtained from the updated RMSI, to obtain the specified information block according to the scheduling information about the specified information block, so as to obtain latest configuration information about the specified reference signal.

In the example of the present disclosure, each specified reference signal may be a semi-continuous reference signal or a periodic reference signal, that is, the configuration information about the specified reference signal may change periodically or irregularly.

In the method for determining an available state of a specified reference signal according to the example of the present disclosure, an available state of one or more specified reference signals is determined according to scheduling information about a specified information block contained in RMSI. The available state of the specified reference signal is marked through scheduling information about an SIB-X, so that the terminal may choose, according to the available state of the specified reference signal, a time for obtaining a system message through the specified reference signal, so as to reduce a frequency at which the terminal obtains the specified reference signal, ensure normal use of the terminal, and further improve the convenience of obtaining the available state of the specified reference signal and the configuration information about the specified reference signal.

Figure 5:
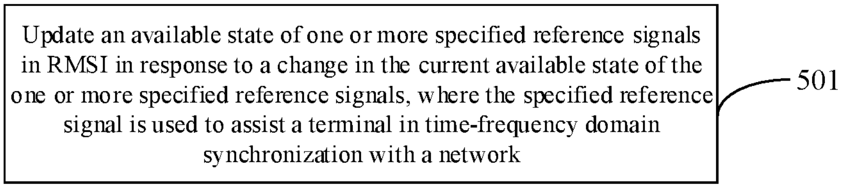
FIG. 5 is a schematic flowchart of yet another method for determining an available state of a specified reference signal according to an example of the present disclosure.

FIG. 5 is a schematic flowchart of yet another method for determining an available state of a specified reference signal according to an example of the present disclosure, where the method is applied to a network device side, for example, a base station.

As shown in FIG. 5, the method for determining an available state of a specified reference signal includes the following steps:

In step 501, an available state of one or more specified reference signals in RMSI is updated in response to a change in the current available state of the one or more specified reference signals, where the specified reference signal is configured to assist a terminal in time-frequency domain synchronization with a network.

It should be noted that a base station sends system messages in a broadcast manner. A system message includes a master information block (MIB) and system information blocks (SIBs). The SIBs are further divided into SIB1 and other SIBs (such as SIB2, 3, 4 . . . ), and the RMSI in the example of the present application is the SIB1. The MIB carries the most necessary information required for the terminal to access a cell, including information such as a system frame number and a sub-carrier interval. The SIB1 carries scheduling information, access control information, and cell selection information about the other SIBs. The other SIBs carry parameters required for other functions, such as cell re-selection, positioning, emergency notification, and sidelink. The terminal needs to constantly obtain MIBs and SIB1s. The terminal may select information in the other SIBs according to its own needs for reading.

The specified reference signal may include at least one of a TRS and a CSI-RS.

In the example of the present disclosure, the base station may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through TRS information, and it may be determined that the specified reference signal is a TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than that in broadcast state information. As long as one kind of the information changes, the base station broadcasts a system message. That is, when the broadcast state information about the specified reference signal changes but the configuration information does not change, the terminal also reads the system message. As a result, the terminal reads the system message too frequently.

Because the system message broadcasted by the base station definitely includes RMSI, information that may be configured to indicate an available state of each specified reference signal may be carried in the RMSI. The base station needs to update the current available state of the one or more specified reference signals in the RMSI and broadcast the same when the current available state of the specified reference signals changes.

As a possible implementation, the system message broadcasted by the base station may include information about whether a specified reference signal has actually been sent to indicate whether the terminal currently needs to obtain the specified reference signal. That is, the available state of the specified reference signal may be represented by a send state of the specified reference signal in the RMSI. That is, in a possible implementation of the example of the present disclosure, step 501 above may include:

updating a send state of the one or more specified reference signals in the RMSI.

In the example of the present disclosure, when the available state of the specified reference signal is identified through the send state of the specified reference signal in the RMSI, the send state of the specified reference signal in the RMSI may be updated according to the actual send state of the specified reference signal sent by the base station.

Further, configuration information about the specified reference signal may be stored in an SIB-X (X is not 1) to further improve the convenience of obtaining the configuration information about the specified reference signal. It may be understood that the available state of the specified reference signal is related to the configuration information about whether the specified reference signal is valid. Consequently, in a possible implementation of the example of the present disclosure, the foregoing method may further include:

updating configuration information about the one or more specified reference signals in a specified information block.

The specified information block may be an SIB-X, where X is not 1. For example, the specified information block may be SIB2, SIB3, SIB4, or the like. In actual use, any SIB except the SIB1, including newly added SIB s, may be determined as the specified information block according to actual requirements and specific application scenarios. This is not limited in the example of the present application.

As a possible implementation, when determining that the configuration information about the one or more specified reference signals changes, the base station may update the configuration information about the specified reference signal in the specified information block. In this case, if the specified reference signal is in a send state, that is, the specified reference signal is available, the available state of the specified reference signal may be updated.

Alternatively, the terminal may obtain the specified information block in a broadcast or on demand manner. That is, in a possible implementation of the example of the present application, the foregoing method may further include:

The specified information block is configured to be obtained by broadcasting a message or obtained on demand.

As a possible implementation, if the terminal is configured to obtain the specified information block by broadcasting a message, the terminal may search and read the specified information block from a broadcast message window of the base station.

As another possible implementation, if the terminal is configured to obtain the specified information block on demand, that is, when determining, according to the available state of the specified reference signal in the RMSI, that the specified reference signal is available, the terminal may actively send an obtaining request to the base station. After obtaining the obtaining request, the base station may broadcast the specified information block to the terminal, so that the terminal may read the specified information block in the broadcast message window.

In the method for determining an available state of a specified reference signal according to the example of the present disclosure, an available state of one or more specified reference signals in RMSI is updated in response to a change in the current available state of the one or more specified reference signals, where the specified reference signal is configured to assist the terminal in time-frequency domain synchronization with a network. In addition, information configured to indicate whether a specified reference signal is available is set in the RMSI, so that the terminal may choose, according to the available state of the specified reference signal, a time for obtaining a system message through the specified reference signal, so as to reduce a frequency at which the terminal obtains the specified reference signal and ensure normal use of the terminal.

In a possible implementation of the present disclosure, an identification bit dedicated to indicating an available state of a specified reference signal may be set in the RMSI to further improve flexibility of marking an available state of a reference signal.

Another method for determining an available state of a specified reference signal, provided in an example of the present disclosure, will be further illustrated below with reference to FIG. 6.

Figure 6:
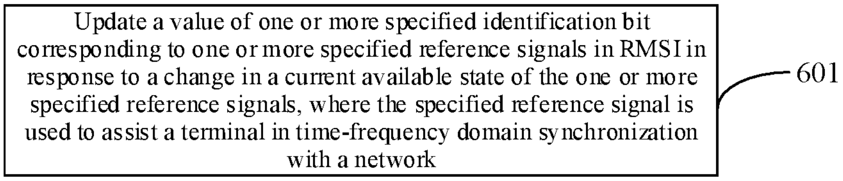
FIG. 6 is a schematic flowchart of another method for determining an available state of a specified reference signal according to an example of the present disclosure.

FIG. 6 is a schematic flowchart of another method for determining an available state of a specified reference signal according to an example of the present disclosure, where the method is applied to a network side, for example, a base station.

As shown in FIG. 6, the method for determining an available state of a specified reference signal includes the following steps:

In step 601, a value of one or more specified identification bit corresponding to one or more specified reference signals in RMSI is updated in response to a change in a current available state of the one or more specified reference signals, where the specified reference signal is configured to assist a terminal in time-frequency domain synchronization with a network.

It should be noted that a base station sends system messages in a broadcast manner. A system message includes a master information block (MIB) and system information blocks (SIBs). The SIBs are further divided into SIB1 and other SIBs, where X=2, 3, 4 . . . . The RMSI in the example of the present disclosure is the SIB1. The MIB carries the necessary information required for the terminal to access a cell, including information such as a system frame number and a sub-carrier interval. The SIB1 carries scheduling information, access control information, and cell selection information about the other SIBs. The other SIBs carry parameters required for other functions, such as cell reselection, positioning, emergency notification, and sidelink. The terminal needs to constantly obtain MIBs and SIB1s. The terminal may select information in the other SIBs according to its own needs for reading.

The specified reference signal may include at least one of a TRS and a CSI-RS.

In the example of the present disclosure, the base station may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through TRS information, and it may be determined that the specified reference signal is a TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than in broadcast state information. As long as one kind of the information changes, the base station broadcasts a system message. That is, when the broadcast state information about the specified reference signal changes but the configuration information does not change, the terminal also reads the system message. As a result, the terminal reads the system message too frequently.

Because the system message broadcasted by the base station definitely includes RMSI, information that may be configured to indicate an available state of each specified reference signal may be carried in the RMSI. The base station may update the current available state of the one or more specified reference signals in the RMSI and broadcast the same when the current available state of the specified reference signals changes.

As a possible implementation, a specified identification bit dedicated to indicating the available state of each specified reference signal may be set in the RMSI, so that the base station may update, according to the available state of each specified reference signal, the value of the specified identification bit corresponding to each specified reference signal to indicate the available state of the specified reference signal through the value of the specified identification bit.

Specifically, when the specified reference signal is in an available state, the corresponding specified identification bit is set as a first set value, and when the specified reference signal is in an unavailable state, the corresponding specified identification bit is set as a second set value. It may be understood that the specified reference signal in an available state indicates that configuration information about the specified reference signal is valid and the specified reference signal is in a send state, that is, the terminal may obtain valid configuration information about the specified reference signal. The specified reference signal in an unavailable state indicates that the specified reference signal has configuration information but is in a non-send state; or configuration information about the specified reference signal is in a broadcast state, but the configuration information in the broadcast state is invalid; or the specified reference signal has no configuration information and is in a send state, which is not limited in this example.

It should be noted that in actual use, the first set value and the second set value may be determined according to actual requirements and specific application scenarios, which is not limited in the example of the present disclosure. For example, the first set value is 1, and the second set value is 0; or the first set value is 0 and the second set value is 1; or the first set value is true and the second set value is false; or the first set value is false and the second set value is true.

Further, in a possible implementation of the example of the present disclosure, if one or more specified reference signals are currently in a send state, but corresponding configuration information is invalid, the base station may also update the available state of the specified reference signals when the configuration information about the specified reference signals changes to be valid. That is, the method may further include:

obtaining a configuration information change instruction for the one or more specified reference signals.

In the example of the present disclosure, if one or more specified reference signals are currently in an unavailable state due to invalid configuration information, the base station may update the available state of the specified reference signals when receiving the configuration information change instruction for the one or more specified reference signals, so that the terminal may obtain updated configuration information about the specified reference signals in a timely manner.

It may be understood that the base station may update the configuration information about the specified reference signals after receiving the configuration information change instruction for the specified reference signals. That is, in a possible implementation of the example of the present disclosure, after obtaining the configuration information change instruction for the one or more specified reference signals, the method may further include:

updating configuration information about the one or more specified reference signals in a specified information block.

The specified information block may be an SIB-X, where X is not equal to 1.

In the example of the present disclosure, the configuration information about each specified reference signal may be stored through a specified information block, so after obtaining the configuration information about the one or more specified reference signals, the base station may update the configuration information about the specified reference signals in the specified information block.

Further, when a specified reference signal is currently in an unavailable state, the base station may also receive a request, sent by the terminal, for configuration information about the specified reference signal. After the base station obtains the request sent by the terminal to obtain the configuration information, if the network side has valid configuration information about the specified reference signal, the base station may update the available state of the specified reference signal and broadcast the configuration information about the specified reference signal. That is, in a possible implementation of the example of the present application, the foregoing method may further include:

obtaining a request message sent by the terminal to obtain the one or more specified reference signals.

In the example of the present disclosure, if it is determined that the value of the specified identification bit corresponding to each specified reference signal is the second set value, it may be determined that each specified reference signal is currently in an unavailable state. When each specified reference signal is currently unavailable, the terminal may not obtain the configuration information about the specified reference signal. However, in order to meet diverse demands of users, the terminal may also send a specified reference signal obtaining request to the base station according to actual running requirements of the terminal or user demands when a specified reference signal is unavailable. When the base station obtains a request message sent by the terminal to obtain one or more specified reference signals, if it is determined according to a strategy that the one or more specified reference signals are currently available, the base station may modify the value of the specified identification bit corresponding to the specified reference signal to the first set value.

Further, after obtaining the specified reference signal obtaining request sent by the terminal, the base station may broadcast the configuration information about the specified reference signal to the terminal, regardless of whether the specified reference signal is available. In a possible implementation of the example of the present disclosure, after obtaining the request message sent by the terminal to obtain one or more specified reference signals, the method may further include:

broadcasting a specified information block, where the specified information block contains the configuration information about the one or more specified reference signals.

In the example of the present disclosure, after the base station obtains the specified reference signal obtaining request sent by the terminal, if it is determined that the specified reference signal is available, the base station may modify the value of the specified identification bit corresponding to the specified reference signal to the first set value and broadcast a system message containing the configuration information (namely, the specified information block) about the specified reference signal to the terminal; or if it is determined that the specified reference signal is unavailable, the base station may not modify the value of the specified identification bit corresponding to the specified reference signal, but still broadcasts a system message containing the configuration information (namely, the specified information block) about the specified reference signal to the terminal. It may be understood that if the base station modifies the value of the specified identification bit corresponding to the specified reference signal to the first set value, the terminal may determine that the configuration information about the specified reference signal, which is obtained from the specified information block, is available, otherwise, the configuration information is unavailable.

Further, when the configuration information in the base station changes, the base station sends a system change notification to the terminal, so that the terminal obtains a change in system information from the base station in a timely manner.

Specifically, in this example, there may be three cases where the base station sends a system message change notification to the terminal:

Case 1

The base station sends a system message change notification to the terminal in the case where the value of any specified identification bit does not change and the configuration information about the specified reference signal corresponding to any specified identification bit is updated.

In the example of the present disclosure, if the value of any specified identification bit does not change, that is, the RMSI does not change, but the configuration information about the specified reference signal changes, that is, the specified information block (SIB-X) changes, the base station needs to send the system message change notification to the terminal, so that the terminal obtains updated configuration information about the specified reference signal in a timely manner.

Case 2

The base station sends a system message change notification to the terminal in the case where the current value of any specified identification bit changes.

In the example of the present disclosure, if the value of any specified identification bit changes, that is, the available state of the specified reference signal corresponding to the specified identification bit changes (the RMSI changes), the base station also needs to broadcast the system message change notification to the terminal.

Case 3

The base station sends a system message change notification to the terminal in the case where the current value of any specified identification bit changes and the configuration information about any specified reference signal is updated.

In the example of the present disclosure, if the value of any specified identification bit changes, that is, the available state of the specified reference signal corresponding to the specified identification bit changes (the RMSI changes), and the configuration information about the specified reference signal changes, that is, the specified information block (SIB-X) changes, the base station also needs to broadcast the system message change notification to the terminal, so that the terminal obtains updated configuration information about the specified reference signal in a timely manner.

In the example of the present disclosure, each specified reference signal may be a semi-continuous reference signal or a periodic reference signal, that is, the configuration information about the reference signal may change periodically or irregularly.

In the method for determining an available state of a specified reference signal according to the example of the present disclosure, a value of a specified identification bit corresponding to one or more specified reference signals in RMSI is updated in response to a change in the current available state of the one or more specified reference signals, where the specified reference signal is configured to assist the terminal in time-frequency domain synchronization with a network. An identification bit dedicated to indicating an available state of a specified reference signal is set in the RMSI, so that the terminal may choose, according to the available state of the specified reference signal, a time for obtaining a system message through the specified reference signal, which reduces a frequency at which the terminal obtains the specified reference signal, ensures normal use of the terminal, and further improves flexibility of marking an available state of a reference signal.

In a possible implementation of the present disclosure, an available state of a specified reference signal may alternatively be indicated through scheduling information about SIB-X, so as to further improve convenience of obtaining the available state of the specified reference signal and the configuration information about the specified reference signal.

Still another method for determining an available state of a specified reference signal, provided in an example of the present disclosure, will be further illustrated below with reference to FIG. 7.

Figure 7:
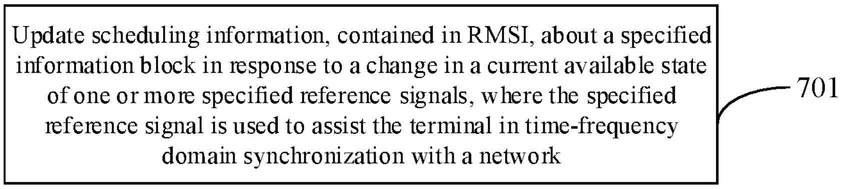
FIG. 7 is a schematic flowchart of still another method for determining an available state of a specified reference signal according to an example of the present disclosure.

FIG. 7 is a schematic flowchart of still another method for determining an available state of a specified reference signal according to an example of the present application, where the method is applied to a terminal.

As shown in FIG. 7, the method for determining an available state of a specified reference signal includes the following steps:

In step 701, scheduling information, contained in RMSI, about a specified information block is updated in response to a change in a current available state of one or more specified reference signals, where the specified reference signal is configured to assist the terminal in time-frequency domain synchronization with a network.

It should be noted that a base station sends system messages in a broadcast manner. A system message includes a master information block (MIB) and system information blocks (SIBs). The SIBs are further divided into SIB1 and other SIBs (such as SIB2, 3, 4 . . . ), and the RMSI in the example of the present disclosure is the SIB1. The MIB carries the necessary information required for the terminal to access a cell, including information such as a system frame number and a sub-carrier interval. The SIB1 carries scheduling information, access control information, and cell selection information about the other SIBs. The other SIBs carry parameters required for other functions, such as cell reselection, positioning, emergency notification, and sidelink. The terminal needs to constantly obtain MIBs and SIB1s. The terminal may select information in the other SIBs according to its own needs for reading.

The specified reference signal may include at least one of a TRS and a CSI-RS.

In the example of the present disclosure, the base station may preset a mode of time-frequency domain synchronization between the terminal and the network according to an actual requirement and a specific application scenario, and then determine a specified reference signal corresponding to the synchronization mode according to the mode of time-frequency domain synchronization between the terminal and the network. For example, the preset mode of time-frequency domain synchronization between the terminal and the network is time-frequency domain synchronization through information in a TRS, and it may be determined that the specified reference signal is the TRS.

In the example of the present disclosure, when the time-frequency domain synchronization between the terminal and the network is implemented through the specified reference signal, in order to ensure that all terminals may obtain a valid specified reference signal, connected terminals and disconnected terminals need to be informed, in a timely manner, of configuration information about the specified reference signal and state information about whether the specified reference signal is being broadcasted. However, a frequency of changes in the configuration information about the specified reference signal is usually lower than in broadcast state information. As long as one kind of the information changes, the base station broadcasts a system message to the terminal. That is, when the broadcast state information about the specified reference signal changes but the configuration information does not change, the terminal also reads the system message. As a result, the terminal reads the system message too frequently.

Because the system message broadcasted by the base station definitely includes RMSI, information that may be configured to indicate an available state of each specified reference signal may be carried in the RMSI.

Generally, the specified reference signal may be in a specified information block, such as SIB-X, while RMSI contains scheduling information about the specified information block. In this example, one or more available states of one or more specified reference signals may be implicitly represented by the scheduling information about the specified information block.

As a possible implementation, if the specified reference signal is available, the RMSI broadcasted by the base station may contain the scheduling information about the specified information block; otherwise, the RMSI may not contain the scheduling information about the specified information block. The available state of the specified reference signal may be indicated through the scheduling information about the specified information block in the RMSI, and the scheduling information about the specified information block in the RMSI is updated when the available state of the specified reference signal changes.

As a possible implementation, the specified reference signal may be plural, and when one or more specified reference signals are available, the RMSI may contain the scheduling information about the specified information block. The terminal may first obtain the specified information block according to the scheduling information in the RMSI, and then obtain the configuration information about the specified reference signal from the specified information block.

As a possible implementation, the base station may delete the scheduling information about the specified information block when each specified reference signal is unavailable. That is, in a possible implementation of the example of the present disclosure, step 701 above may include:

deleting the scheduling information, contained in the RMSI, about the specified information block in the case where the available state of any specified reference signal changes to unavailable and the available states of the remaining specified reference signals are all unavailable.

In the example of the present disclosure, if the base station determines that the available state of any specified reference signal changes to unavailable, and the available states of the remaining specified reference signals are also unavailable, the base station may delete the scheduling information about the specified information block contained in the RMSI, so that the terminal may determine that there is currently no available specified reference signals.

As a possible implementation, the base station may add the scheduling information about the specified information block to the RMSI when the available state of any specified reference signal changes to available and there is no scheduling information about the specified information block in the original RMSI. That is, in a possible implementation of the example of the present disclosure, step 701 above may include:

adding the scheduling information about the specified information block to the RMSI in the case where the available state of any specified reference signal changes to available and the available states of the remaining specified reference signals are all unavailable.

In the example of the present disclosure, if the base station determines that the available state of any specified reference signal changes to available, and the available states of the remaining specified reference signals are all unavailable, the base station may determine that the RMSI currently contains no scheduling information about the specified information block, and the base station may add the scheduling information about the specified information block to the RMSI and broadcast a system message to the terminal, so that the terminal obtains updated system information in a timely manner.

As a possible implementation, when the available state of the specified reference signal changes to available and the RMSI contains the scheduling information about the specified information block, the scheduling information about the specified information block may be maintained unchanged. That is, in a possible implementation of the example of the present disclosure, step 701 above may include:

maintaining the scheduling information, contained in the RMSI, about the specified information block unchanged in the case where the available state of any specified reference signal changes to available and the available state of at least one of the remaining specified reference signals is available.

In the example of the present disclosure, if there is an available specified reference signal among the specified reference signals, the RMSI already contains the scheduling information about the specified information block, and when the available state of any specified reference signal changes from unavailable to available, the scheduling information about the specified information block in the RMSI may be maintained unchanged.

In the example of the present disclosure, each specified reference signal may be a semi-continuous reference signal or a periodic reference signal.

In the method for determining an available state of a specified reference signal according to the example of the present disclosure, scheduling information, contained in RMSI, about a specified information block is updated in response to a change in a current available state of any specified reference signal, where the specified reference signal is configured to assist a terminal in time-frequency domain synchronization with a network. The available state of the specified reference signal is marked through scheduling information about an SIB-X, so that the terminal may choose, according to the available state of the specified reference signal, a time for obtaining a system message through the specified reference signal, so as to reduce a frequency at which the terminal obtains the specified reference signal, ensure normal use of the terminal, and further improve the convenience of obtaining the available state of the specified reference signal and the configuration information about the specified reference signal.

In order to implement the foregoing examples, the present disclosure further provides an apparatus for determining an available state of a specified reference signal.

Figure 8:
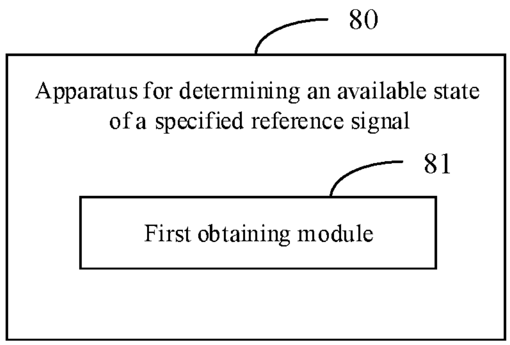
FIG. 8 is a schematic structural diagram of an apparatus for determining an available state of a specified reference signal according to an example of the present disclosure.

FIG. 8 is a schematic structural diagram of an apparatus for determining an available state of a specified reference signal according to an example of the present disclosure, where the apparatus is applied to a terminal.

As shown in FIG. 8, the apparatus 80 for determining an available state of a specified reference signal includes:

a first obtaining module 81, configured to obtain an available state of one or more specified reference signals from RMSI, where the specified reference signal is configured to assist the terminal in time-frequency domain synchronization with a network.

In practical use, the apparatus for determining an available state of a specified reference signal according to the example of the present disclosure may be configured in any communication device to perform the foregoing method for determining an available state of a specified reference signal.

In the apparatus for determining an available state of a specified reference signal according to the example of the present disclosure, an available state of one or more specified reference signals is obtained from RMSI, where the specified reference signal is configured to assist a terminal in time-frequency domain synchronization with a network. In addition, information configured to indicate whether a specified reference signal is available is set in the RMSI, so that the terminal may choose, according to the available state of the specified reference signal, a time for obtaining a system message through the specified reference signal, so as to reduce a frequency at which the terminal obtains the specified reference signal and ensure normal use of the terminal.

In a possible implementation of the present disclosure, the first obtaining module 81 includes:

a first obtaining unit, configured to obtain a send state of the one or more specified reference signals from the RMSI.

Further, in another possible implementation of the present disclosure, the specified reference signal is at least one of the following signals: a TRS and a CSI-RS.

Further, in still another possible implementation of the present disclosure, the apparatus 80 for determining an available state of a specified reference signal further includes:

a second obtaining module, configured to obtain configuration information about the one or more specified reference signals from a specified information block.

Further, in yet another possible implementation of the present disclosure, the apparatus 80 for determining an available state of a specified reference signal further includes:

a third obtaining module, configured to obtain the specified information block.

Further, in yet another possible implementation of the present disclosure, the third obtaining module includes:

a reading unit, configured to read the specified information block from a broadcast message window of a base station;

or a requesting unit, configured to request a base station for the specified information block in response to detecting that a broadcast state identification bit corresponding to the specified information block in the RMSI is a second set value, Further, in another possible implementation of the present disclosure, the first obtaining module 81 includes:

a second obtaining unit, configured to obtain a value of one or more specified identification bits from the RMSI; and a first determination unit, configured to determine the available state of the corresponding one or more specified reference signals according to the value of the one or more specified identification bits.

Further, in still another possible implementation of the present disclosure, the first obtaining module 81 further includes:

a sending unit, configured to send a specified reference signal obtaining request to the base station; and a third obtaining unit, configured to obtain the specified information block containing the specified reference signal.

Further, in yet another possible implementation of the present disclosure, the apparatus 80 for determining an available state of a specified reference signal further includes:

a fourth obtaining module, configured to obtain the specified information block in response to detecting a change in a value tag corresponding to the specified information block in the RMSI; and a fifth obtaining module, configured to obtain, from the specified information block, configuration information after the one or more specified reference signals change.

Further, in yet another possible implementation of the present disclosure, the apparatus 80 for determining an available state of a specified reference signal further includes:

a sixth obtaining module, configured to obtain updated RMSI in response to a change in the current value of the one or more specified identification bits.

Further, in another possible implementation of the present disclosure, the fourth obtaining module is specifically configured to:

obtain the specified information block in the case where the current value of each specified identification bit is unchanged, a change notification, sent by the base station, of configuration information about any specified reference signal is obtained, and the value tag corresponding to the specified information block in the RMSI is detected to change; and obtain, from the specified information block, configuration information after the any one specified reference signal changes;

or specifically configured to obtain updated RMSI and an updated specified information block in the case where the current value of one or more specified identification bits is changed, a change notification, sent by the base station, of configuration information about the one or more specified reference signals is obtained, and the value tag corresponding to the specified information block in the RMSI is detected to change.

Further, in yet another possible implementation of the present disclosure, the first obtaining module 81 includes:

a fourth obtaining unit, configured to determine the available state of the one or more specified reference signals according to whether the RMSI contains scheduling information about the specified information block.

Further, in yet another possible implementation of the present disclosure, the apparatus 80 for determining an available state of a specified reference signal further includes:

a second updating module, configured to update the RMSI in response to determining that the scheduling information about the specified information block, which is sent by the base station, is from present to none; and a resetting module, configured to set the locally stored specified information block to an invalid state, or maintain the locally stored specified information block in a valid state, in the case where the updated RMSI does not contain the scheduling information about the specified information block.

Further, in another possible implementation of the present disclosure, the apparatus 80 for determining an available state of a specified reference signal further includes:

a third update module, configured to update the RMSI in response to determining that the scheduling information about the specified information block, which is sent by the base station, is from none to present; and a ninth obtaining module, configured to obtain the specified information block according to the scheduling information about the specified information block in the updated RMSI.

Further, in still another possible implementation of the present disclosure, the apparatus 80 for determining an available state of a specified reference signal further includes:

a fourth updating module, configured to update the RMSI in response to obtaining that the scheduling information about the specified information block, which is sent by the base station, is from none to present; and a tenth obtaining module, configured to obtain, in response to detecting a change in the value tag of the specified information block in the updated RMSI, the specified information block according to the scheduling information about the specified information block in the updated RMSI.

Further, in yet another possible implementation of the present disclosure, each specified reference signal is a semi-continuous reference signal or a periodic reference signal.

It should be noted that the explanation of the foregoing method for determining an available state of a specified reference signal shown in FIGS. 1, 2, 3, and 4 is also applicable to the apparatus 80 for determining an available state of a specified reference signal in this example, and details are not repeated.

In the apparatus for determining an available state of a specified reference signal according to the example of the present disclosure, a value of one or more specified identification bits is obtained from RMSI, and an available state of each specified reference signal is determined according to the value of the one or more specified identification bits. An identification bit dedicated to indicating an available state of a specified reference signal is set in the RMSI, so that the terminal may choose, according to the available state of the specified reference signal, a time for obtaining a system message through the specified reference signal, which reduces a frequency at which the terminal obtains the specified reference signal, ensures normal use of the terminal, and further improves flexibility of marking an available state of a reference signal.

In order to implement the foregoing examples, the present disclosure further provides an apparatus for determining an available state of a specified reference signal.

Figure 9:
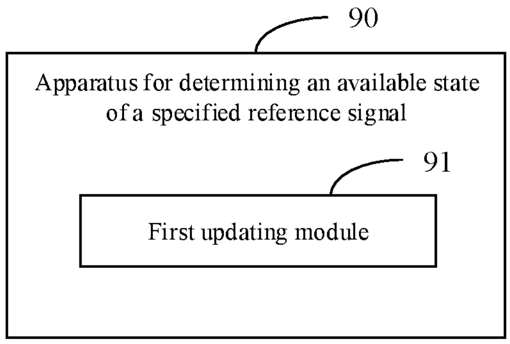
FIG. 9 is a schematic structural diagram of another apparatus for determining an available state of a specified reference signal according to an example of the disclosure.

FIG. 9 is a schematic structural diagram of another apparatus for determining an available state of a specified reference signal according to an example of the present disclosure, where the apparatus is applied to a base station.

As shown in FIG. 9, the apparatus 90 for determining an available state of a specified reference signal includes:

a first updating module 91, configured to update an available state of one or more specified reference signals in RMSI in response to a change in the current available state of the one or more specified reference signals, where the specified reference signal is configured to assist a terminal in time-frequency domain synchronization with a network.

In practical use, the apparatus for determining an available state of a specified reference signal according to the example of the present disclosure may be configured in any communication device to perform the foregoing method for determining an available state of a specified reference signal.

In the apparatus for determining an available state of a specified reference signal according to the example of the present application, an available state of one or more specified reference signals in RMSI is updated in response to a change in the current available state of the one or more specified reference signals, where the specified reference signal is configured to assist a terminal in time-frequency domain synchronization with a network. In addition, information configured to indicate whether a specified reference signal is available is set in the RMSI, so that the terminal may choose, according to the available state of the specified reference signal, a time for obtaining a system message by obtaining the specified reference signal, so as to reduce a frequency at which the terminal obtains the specified reference signal and ensure normal use of the terminal.

In a possible implementation of the present disclosure, the first updating module 91 includes:

a first updating unit, configured to update a send state of the one or more specified reference signals in the RMSI.

Further, in another possible implementation of the present disclosure, the specified reference signal is at least one of the following signals: a TRS and a CSI-RS.

Further, in still another possible implementation of the present disclosure, the apparatus 90 for determining an available state of a specified reference signal further includes:

a fifth updating module, configured to update configuration information about the one or more specified reference signals in a specified information block.

Further, in yet another possible implementation of the present disclosure, the apparatus 90 for determining an available state of a specified reference signal further includes:

a configuration module, configured to configure the specified information block to be obtained by broadcasting a message or obtained on demand.

Further, in yet another possible implementation of the present disclosure, the first updating module 91 includes:

a second updating unit, configured to update a value of one or more specified identification bits corresponding to the one or more specified reference signals in the RMSI.

Further, in another possible implementation of the present disclosure, the apparatus 90 for determining an available state of a specified reference signal further includes:

a first sending module, configured to send a system message change notification to the terminal in the case where the value of any specified identification bit does not change and the configuration information about the specified reference signal corresponding to any specified identification bit is updated.

Further, in still another possible implementation of the present disclosure, the apparatus 90 for determining an available state of a specified reference signal further includes:

a second sending module, configured to send a system message change notification to the terminal in the case where the current value of any specified identification bit changes.

Further, in yet another possible implementation of the present disclosure, the apparatus 90 for determining an available state of a specified reference signal further includes:

a third sending module, configured to send a system message change notification to the terminal in the case where the current value of any specified identification bit changes and the configuration information about any specified reference signal is updated.

Further, in another possible implementation of the present disclosure, the apparatus 90 for determining an available state of a specified reference signal further includes:

an eleventh obtaining module, configured to obtain a request message sent by the terminal to obtain the one or more specified reference signals.

Further, in still another possible implementation of the present disclosure, the apparatus 90 for determining an available state of a specified reference signal further includes:

a broadcasting module, configured to broadcast a specified information block, where the specified information block contains the configuration information about the one or more specified reference signals.

Further, in yet another possible implementation of the present disclosure, the apparatus 90 for determining an available state of a specified reference signal further includes:

a twelfth obtaining module, configured to obtain a configuration information change instruction for the one or more specified reference signals.

Further, in yet another possible implementation of the present disclosure, the apparatus 90 for determining an available state of a specified reference signal further includes:

a sixth updating module, configured to update the configuration information about the one or more specified reference signals in the specified information block.

Further, in another possible implementation of the present disclosure, the first updating module includes:

a third updating unit, configured to update scheduling information, contained in the RMSI, about the specified information block.

Further, in still another possible implementation of the present application, the third updating unit is specifically configured to:

deleting the scheduling information, contained in the RMSI, about the specified information block in the case where the available state of any specified reference signal changes to unavailable and the available states of the remaining specified reference signals are all unavailable.

Further, in yet another possible implementation of the present disclosure, the third updating unit is specifically configured to:

adding the scheduling information about the specified information block to the RMSI in the case where the available state of any specified reference signal changes to available and the available states of the remaining specified reference signals are all unavailable.

Further, in yet another possible implementation of the present disclosure, each specified reference signal is a semi-continuous reference signal or a periodic reference signal.

It should be noted that the explanation of the foregoing method for determining an available state of a specified reference signal shown in FIGS. 5, 6, and 7 is also applicable to the apparatus 90 for determining an available state of a specified reference signal in this example, and details are not repeated.

In the apparatus for determining an available state of a specified reference signal according to the example of the present disclosure, a value of a specified identification bit corresponding to any specified reference signal in RMSI is updated in response to a change in a current available state of any specified reference signal, where the specified reference signal is configured to assist a terminal in time-frequency domain synchronization with a network. An identification bit dedicated to indicating an available state of a specified reference signal is set in the RMSI, so that the terminal may choose, according to the available state of the specified reference signal, a time for obtaining a system message through the specified reference signal, which reduces a frequency at which the terminal obtains the specified reference signal, ensures normal use of the terminal, and further improves flexibility of marking an available state of a reference signal.

In order to implement the foregoing examples, the present disclosure further provides a communication device.

The communication device provided in an example of the present disclosure includes a processor, a transceiver, a memory, and an executable program stored in the memory and executable by the processor, where the processor, when running the executable program, performs the method for determining an available state of a specified reference signal provided by any foregoing technical solution.

The communication device may be the foregoing base station or terminal.

The processor may include various types of storage mediums, and the storage medium is a non-transitory computer storage medium and can continue to memorize the information stored in the storage medium after the communication device is powered down. The communication device includes a base station or a terminal.

The processor may be connected to the memory by a bus or the like, and is used to read the executable program stored on the memory, for example, at least one of FIGS. 1 to 7.

In order to implement the foregoing examples, the present disclosure further provides a non-transitory computer storage medium.

The non-transitory computer storage medium provided in an example of the present disclosure stores an executable program; and after executed by a processor, the executable program can implement the method for determining an available state of a specified reference signal provided by any foregoing technical solution, for example, at least one of FIGS. 1 to 7.

Figure 10:
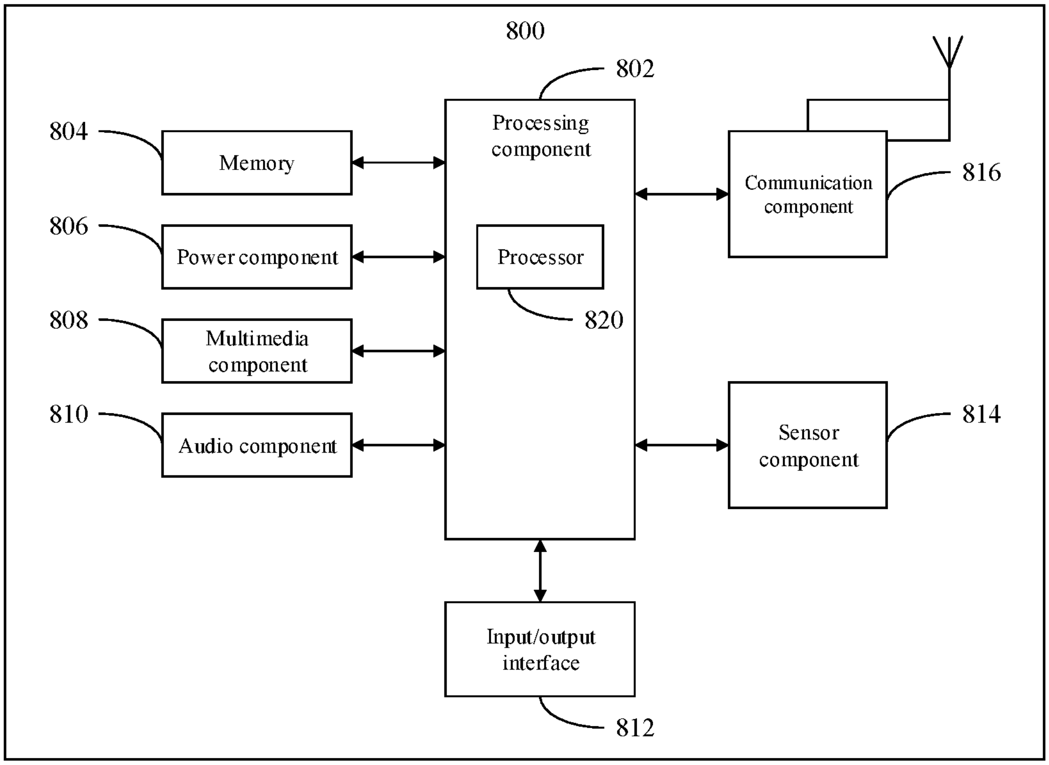
FIG. 10 is a block diagram of user equipment according to an example of the present disclosure.

FIG. 10 is a block diagram of a UE 800 according to an example of the present disclosure. For example, the UE 800 may be a mobile phone, a computer, a digital broadcast user equipment, a messaging device, a game console, a tablet device, a medical device, a fitness device, a personal digital assistant, or the like.

With reference to FIG. 10, the UE 800 may include at least one of the following components: a processing component 802, a memory 804, a power component 806, a multimedia component 808, an audio component 810, an input/output (I/O) interface 812, a sensor component 814, and a communication component 816.

The processing component 802 usually controls overall operations of the UE 800, such as operations associated with display, telephone call, data communication, camera operations, and recording operations. The processing component 802 may include at least one processor 820 to execute instructions to complete all of or part of the steps of the foregoing method. In addition, the processing component 802 may include at least one module to facilitate the interaction between the processing component 802 and other components. For example, the processing component 802 may include a multimedia module to facilitate interaction between the multimedia component 808 and the processing component 802.

The memory 804 is configured to store various types of data to support the operations at the UE 800. Examples of these data include instructions for any application or method operated on the UE 800, contact data, phone book data, messages, pictures, videos, and the like. The memory 804 may be implemented by any type of volatile or non-volatile storage device or a combination of the volatile device and the non-volatile storage device, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power for various components of the UE 800. The power component 806 may include a power management system, at least one power source, and other components associated with power generation, management and distribution of the UE 800.

The multimedia component 808 includes a screen for providing an output interface between the UE 800 and the user. In some examples, the screen may include a liquid crystal display (LCD) and a touch panel (TP). If the screen includes a touch panel, the screen may be implemented as a touch screen to receive input signals from the user. The touch panel includes at least one touch sensor to sense touches, slides and gestures on the touch panel. The touch sensor may sense not only the boundary of the touch or slide, but also the wake-up time and pressure associated with the touch or slide. In some examples, the multimedia component 808 includes a front camera and/or a rear camera. When the UE 800 is in an operation mode, such as a shooting mode or a video mode, the front camera and/or the rear camera may receive external multimedia data. Each front or rear camera may be a fixed optical lens system or have a focal length and optical zoom capability.

The audio component 810 is configured to output and/or input audio signals. For example, the audio component 810 includes a microphone (MIC), and when the UE 800 is in an operation mode, such as a call mode, a recording mode, and a voice recognition mode, the microphone is configured to receive external audio signals. The received audio signals may be further stored in the memory 804 or sent by the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, buttons, or the like. These buttons may include, but are not limited to a home button, a volume button, a start button, and a lock button.

The sensor component 814 includes at least one sensor for providing various aspects of state assessment for the UE 800. For example, the sensor component 814 may detect an on/off state of the equipment 800, and relative positions of components such as a display and a keypad of the UE 800. The sensor component 814 may further detect a position change of the UE 800 or one component of the UE 800, presence or absence of contact between the user and the UE 800, an orientation or acceleration/deceleration of the UE 800 and a temperature change of the UE 800. The sensor component 814 may include a proximity sensor configured to detect the presence of nearby objects without any physical contact. The sensor component 814 may also include an optical sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the UE 800 and other devices. The UE 800 may access a wireless network based on communication standards, such as WiFi, 2G or 3G, or a combination of WiFi, 2G or 3G. In an example, the communication component 816 receives broadcast signals or broadcast associated information from an external broadcast management system via a broadcast channel In an example, the communication component 816 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the UE 800 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronic components to perform the foregoing method.

In an example, there is further provided a non-transitory computer-readable storage medium including instructions, such as a memory 804 including instructions and the instructions may be executed by the processor 820 of the UE 800 to complete the foregoing method. For example, the non-transitory computer-readable storage medium may be an ROM, a random access memory (RAM), a CD-ROM, a magnetic tape, a floppy disk, an optical data storage device, etc.

Figure 11:
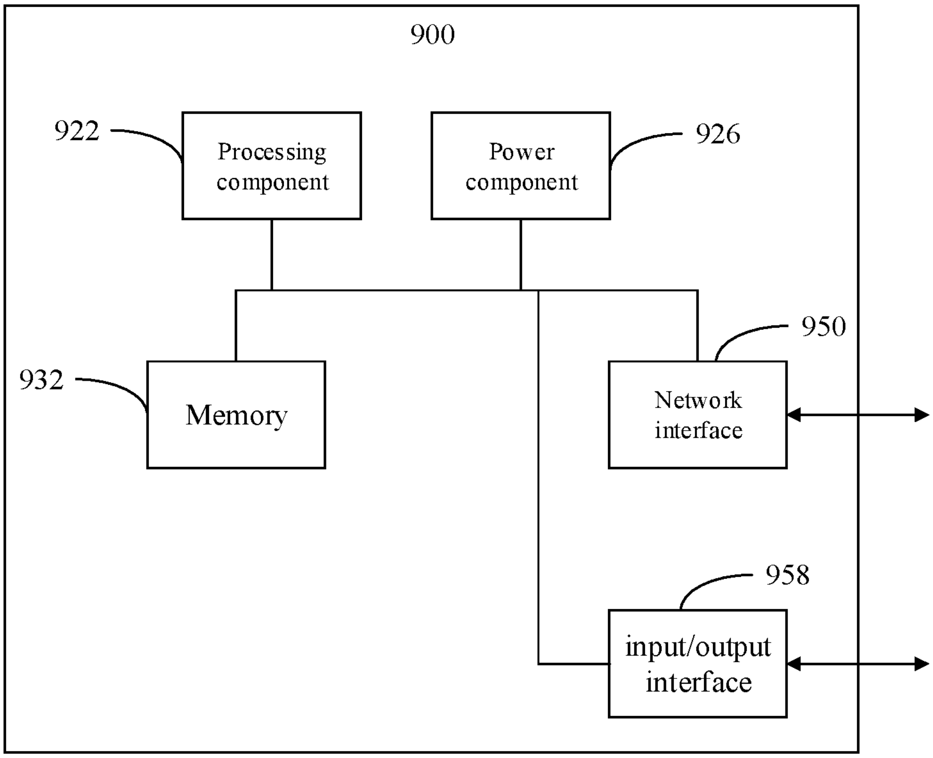
FIG. 11 is a schematic structural diagram of a base station according to an example of the present disclosure.

FIG. 11 is a schematic structural diagram of a base station according to an example of the present disclosure. For example, a base station 900 may be provided as a network device. With reference to FIG. 11, the base station 900 includes a processing component 922, and further includes at least one processor, and a memory resource represented by the memory 932, configured to store instructions which may be executed by the processing component 922, such as applications. The applications stored in the memory 932 may include one or more modules each corresponding to a set of instructions. In addition, the processing component 922 is configured to execute instructions, to execute any methods applied to the base station of the above methods, such as the methods shown in FIGS. 5 to 7.

The base station 900 may also include a power component 926 configured to execute power supply management on the base station 900, a wired or wireless network interface 950 configured to connect the base station 900 to a network, and an input/output (I/O) interface 958. The base station 900 may operate an operating system stored in the memory 932, such as Windows Server™, Mac OS X™, Unix™, Linux FreeBSD™ or the like.

Those skilled in the art would readily conceive of other implementations of the present disclosure after considering the specification and practicing the invention disclosed here. The present disclosure is intended to cover any variations, uses, or adaptive changes of the present disclosure. These variations, uses, or adaptive changes follow the general principle of the present disclosure and include common general knowledge or conventional technical means in the technical field that are not disclosed in the present disclosure. The specification and examples are considered as illustrative examples, and the true scope and spirit of the present disclosure are indicated by the following claims.

It should be understood that the present disclosure is not limited to the precise structure described above and shown in the drawings, and various modifications and changes may be made without departing from the scope of the present disclosure. The scope of the present disclosure is merely limited by the appended claims.

What is claimed is:

1. A method for determining an available state of a specified reference signal, performed by a terminal based on non-transitory computer-executable instructions, the method comprising:

- obtaining an available state of one or more specified reference signals from remaining minimum system information (RMSI), wherein the RMSI is carried in a master information block (SIB)-1, the one or more specified reference signals are configured to assist the terminal in time-frequency domain synchronization with a network, and the specified reference signal is at least one of a tracking reference signal (TRS) or a channel state information-reference signal (CSI-RS);
- obtaining a specified information block in a case where the one or more specified reference signals are in the available state;
- obtaining configuration information about the one or more specified reference signals from the specified information block, wherein the specified information block is an SIB-X, wherein X is not 1; and
- performing synchronization in time-frequency domain with the network according to the configuration information about the one or more specified reference signals;
- wherein obtaining the available state of the one or more specified reference signals from the RMSI comprises: obtaining a send state of the one or more specified reference signals from the RMSI; and
- wherein the one or more specified reference signals being in the available state indicate that configuration information about the one or more specified reference signals is valid, and the one or more specified reference signals are in a send state.

2. The method according to claim 1, wherein obtaining an available state of one or more specified reference signals from RMSI comprises:

- obtaining a value of one or more specified identification bits from the RMSI; and
- determining the available state of corresponding one or more specified reference signals according to the value of the one or more specified identification bits.

3. The method according to claim 2, wherein after determining the available state of the corresponding one or more specified reference signals according to the value of the one or more specified identification bits, the method further comprises:

sending a specified reference signal obtaining request to a base station; and obtaining a specified information block containing the specified reference signal.

4. The method according to claim 2, further comprising:

obtaining a specified information block in response to detecting a change in a value tag corresponding to the specified information block in the RMSI; and obtaining, from the specified information block, configuration information after the corresponding one or more specified reference signals change.

5. The method according to claim 2, further comprising:

obtaining updated RMSI in response to a change in the current value of the one or more specified identification bits.

6. The method according to claim 1, wherein obtaining the specified information block comprises:

reading the specified information block from a broadcast message window of a base station;

or requesting a base station for the specified information block in response to detecting that a broadcast state identification bit corresponding to the specified information block in the RMSI is a second set value.

7. A non-transitory computer-readable storage medium, applied to a terminal based on non-transitory computer-executable instructions, the non-transitory computer-readable storage medium storing the non-transitory computer-executable instructions, wherein the non-transitory computer-executable instructions, when executed by a processor, cause the processor to:

obtain an available state of one or more specified reference signals from remaining minimum system information (RMSI), wherein the RMSI is carried in a master information block (SIB)-1, the one or more specified reference signals are configured to assist the terminal in time-frequency domain synchronization with a network, and the specified reference signal is at least one of a tracking reference signal (TRS) or a channel state information-reference signal (CSI-RS);

obtain a specified information block in a case where the one or more specified reference signals are in the available state;

obtain configuration information about the one or more specified reference signals from the specified information block, wherein the specified information block is an SIB-X, wherein X is not 1; and perform synchronization in time-frequency domain with the network according to the configuration information about the one or more specified reference signals;

wherein obtaining the available state of the one or more specified reference signals from the RMSI comprises: obtaining a send state of the one or more specified reference signals from the RMSI; and wherein the one or more specified reference signals being in the available state indicate that configuration information about the one or more specified reference signals is valid, and the one or more specified reference signals are in a send state.

8. A communication device, applied to a terminal based on non-transitory computer-executable instructions, the communication device comprising:

a transceiver;

a memory; and a processor, which is connected to the transceiver and the memory respectively, is configured to control wireless signal transceiving of the transceiver by executing computer executable instructions on the memory, and implements a method comprising:

obtaining an available state of one or more specified reference signals from remaining minimum system information (RMSI), wherein the RMSI is carried in a master information block (SIB)-1, the one or more specified reference signals are configured to assist the terminal in time-frequency domain synchronization with a network, and the specified reference signal is at least one of a tracking reference signal (TRS) or a channel state information-reference signal (CSI-RS);

obtaining a specified information block in a case where the one or more specified reference signals are in the available state;

obtaining configuration information about the one or more specified reference signals from the specified information block, wherein the specified information block is an SIB-X, wherein X is not 1; and performing synchronization in time-frequency domain with the network according to the configuration information about the one or more specified reference signals;

wherein obtaining the available state of the one or more specified reference signals from the RMSI comprises: obtaining a send state of the one or more specified reference signals from the RMSI; and wherein the one or more specified reference signals being in the available state indicate that configuration information about the one or more specified reference signals is valid, and the one or more specified reference signals are in a send state.

* * * * *